United States Patent [19]

Dutcher et al.

[11] Patent Number: 4,752,931
[45] Date of Patent: Jun. 21, 1988

[54] PULSE SHAPER FOR AN ELECTRO-OPTICALLY Q-SWITCHED SEEDED LASER

[75] Inventors: John A. Dutcher, Mountain View; David G. Scerbak, Morgan Hill, both of Calif.

[73] Assignee: Lightwave Electronics Co., Mountain View, Calif.

[21] Appl. No.: 892,110

[22] Filed: Aug. 4, 1986

[51] Int. Cl.⁴ .............................................. H01S 3/098
[52] U.S. Cl. ........................................ 372/18; 372/10; 372/12; 372/19; 372/32; 372/38
[58] Field of Search ................... 372/12, 18, 19, 32, 372/38, 10, 81, 82, 98

[56] References Cited

U.S. PATENT DOCUMENTS

| 3,701,956 | 10/1972 | Simmons | 372/12 |
| 3,836,866 | 9/1974 | Ammann et al. | 372/12 |
| 4,197,513 | 4/1980 | Bell et al. | 372/12 |
| 4,380,073 | 4/1983 | Wayne | 372/12 |
| 4,455,657 | 6/1984 | Byer | 372/18 |

OTHER PUBLICATIONS

C. P. Wang; "Master and Slave Oscillator Array System for Very Large Multiline Lasers"; Jan. 1, 1978; vol. 17, No. 1; Applied Optics; pp. 83-86.
Schmitt et al; "Diode-Laser-Pumped Nd:Yag Laser Injection Seeding System"; Mar. 1, 1986; vol. 25, No. 5/Applied Optics, pp. 629-633.

Primary Examiner—James W. Davie
Assistant Examiner—B. Randolph
Attorney, Agent, or Firm—Harry E. Aine

[57] ABSTRACT

A seeded electro-optically Q-switches laser includes a pulser for pulsing the Q-switch within the seeded laser. The Q-switch pulser includes a pulse-shaping network having a saturable core inductor connected in series with the flow of current to the Q-switch for causing the developed pulse voltage waveform in Q-switch to have an initially reduced rate of change to reduce unwanted Fourier frequency components of the seed optical radiation in the optical resonator of the slave laser, whereby enhanced single-mode operation of the slave laser is obtained with reduced seed power.

5 Claims, 1 Drawing Sheet

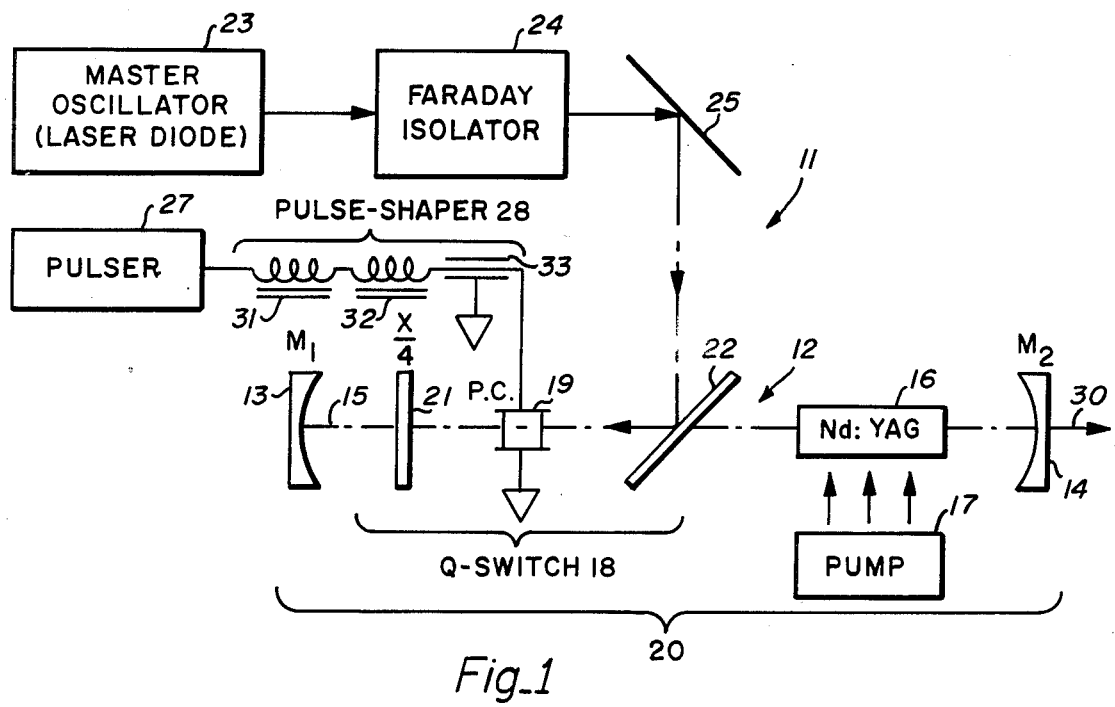
Fig_1
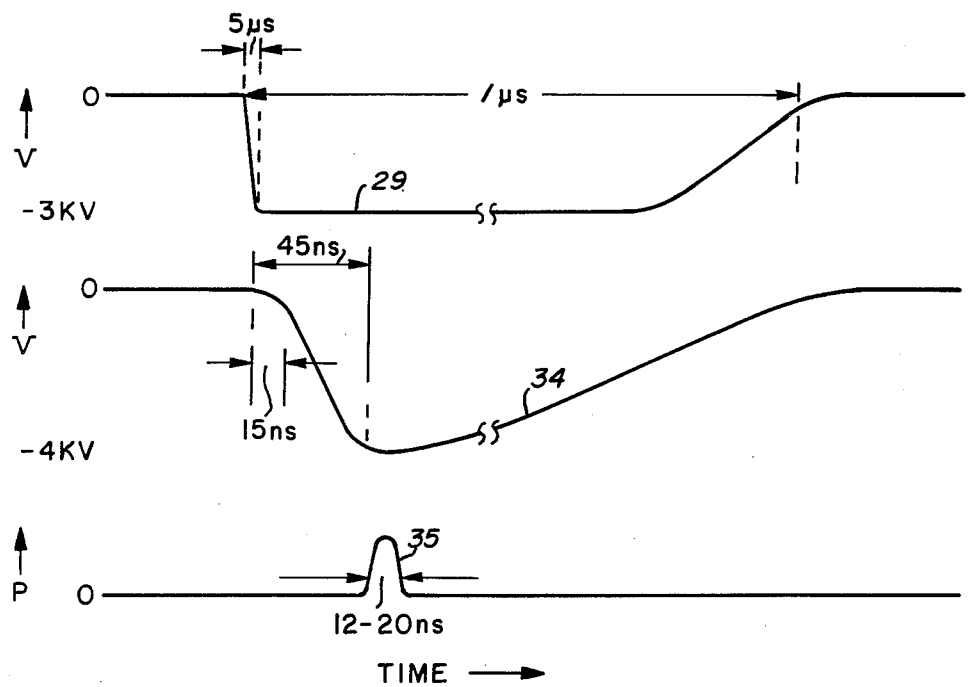
Fig_2

PULSE SHAPER FOR AN ELECTRO-OPTICALLY Q-SWITCHED SEEDED LASER

BACKGROUND OF THE INVENTION

The present invention relates in general to an injection seeded Q-switched laser for achieving single-mode operation wherein the seeding is accomplished by introducing light from a stable, single-frequency master oscillator into the high power Q-switched laser cavity during the pulse build-up period.

DESCRIPTION OF THE PRIOR ART

Heretofore, it has been proposed to introduce light from a stable, single-frequency master oscillator into the high power Q-switched laser cavity during the pulse build-up period. Both the injected, single-mode light and spontaneous emission from the high power Q-switched laser will be regeneratively amplified in the Q-switched laser cavity. If the injected signal has enough power on a resonant mode of the cavity of the Q-switched laser, the corresponding single-axial mode will eventually saturate the homegenously broadened gain medium and in the absence of spatial hole burning, prevent development of any other axial modes from spontaneous emission.

Such injection seeding systems, to achieve single-mode operation, are disclosed in U.S. Pat. No. 4,455,657 issued June 19, 1984 and in an article entitled: "Feedback Stabilization of an Injection-Seeded Nd:YAG laser", appearing in Applied Optics, Vol. 24, No. 7, of Apr. 1, 1985, pgs. 940-942.

While such prior art systems have succeeded in locking the slave laser output wavelength to the wavelength of the master oscillator, and have produced single-mode operation, they have done so with relatively expensive, high power, seed lasers. It has been reported that stable injection seeded operation occurs, with these prior art systems, with as little as two milliwatts mW power from the master oscillator into the slave laser.

It is desirable to provide an improved laser injection seeding system utilizing a single-mode output power from a diode laser pumped Nd:YAG laser providing an order of magnitude less seed power into the slave cavity, i.e., on the order of 200 microwatts. This would greatly reduce the complexity of and the fabrication cost of the injection seeding system.

One problem encountered in injection seeding of the slave laser is that fast switching of the slave laser during the pulse build-up period produces Fourier transform sidebands of the single-mode seed light. These sidebands can excite unwanted adjacent resonant modes of the slave laser, such that the slave laser will not be locked to the wavelength of the seed laser. This is a particularly important problem when the seed power is on the order of 200 microwatts or less.

SUMMARY OF THE PRESENT INVENTION

The principal object of the present invention is the provision of an improved laser injection seeding system for locking a slave laser to the wavelength of the seed laser, and more particularly, to such a system employing an improved pulse shaper for shaping the waveform applied to the Q-switch to minimize Fourier transform components of the seed signal.

In one feature of the present invention, the Q-switch pulser includes a pulse-shaping network including a saturable core inductor connected in series with the flow of current from the pulser to the Q-switch for causing the applied Q-switch voltage waveform to have an initially reduced rate of change to reduce unwanted Fourier frequency components of the seed signal, whereby enhanced single-mode operation of the slave laser is obtained with reduced seed power.

In another feature of the present invention, the pulse shaper circuit includes a plurality of saturable core inductors connected in series with the flow of current to the Q-switch for causing the applied pulse voltage waveform to have the desired initially reduced rate of change.

In another feature of the present invention, the pulse-shaper network includes a length of coaxial cable connected to the Q-switch over which the applied pulse waveform is developed in the Q-switch with the distributed capacity of the coaxial cable falling within the range of 10 to 40 pf connected in parallel with the stray capacitance-to-ground of the Q-switch.

In another feature of the present invention, the saturable core inductor has a Q less than 10.

In another feature of the present invention, the initial rate of change of the shaped Q-switch driver waveform is less than 750 volts in the first 15 nanoseconds.

Other features and advantages of the present invention will become apparent upon a perusal of the following specification taken in connection with the accompanying drawings wherein:

BRIEF DESCRIPTION OF THE DRAWINGS

FIG. 1 is a schamtic drawing, partly in block diagram form, of a Q-switched seeded laser system incorporating features of the present invention, and FIG. 2 is a plot of several of the waveforms produced in the system of FIG. 1.

DESCRIPTION OF THE PREFERRED EMBODIMENTS

Referring now to FIG. 1, there is shown a Q-switched, seeded laser system 11 incorporating features of the present invention. The seeded or slave laser 12 includes a pair of axially spaced mirrors 13 and 14 spaced apart along an optical axis 15 and defining the optical resonator 20 of the laser 12.

A laser gain medium 16, such as a Nd:YAG lasant rod, is disposed on the optical axis 15 within the resonator 20 for supplying gain to the excited optical resonant mode of the optical resonator 20. An optical pump 17 illuminates the laser gain medium 16 with optical pumping radiation to provide a population inversion of the laser transitions within the laser gain medium 16.

An electro-optical Q-switch 18 is disposed on the optical axis 15 of the optical resonator 20 for switching between a lossy state and a transmissive state, for switching on the slave laser 12. The Q-swtich 18 includes a pockel cell 19 which, when pulsed ON by a voltage applied across the electro-optical pockel cell member 19, serves to rotate the plane of polarization of light passing therethrough by 90 degrees for a double pass, i.e., it serves as a pulsed quarterwave plate. The Q-switch also includes a quarterwave plate 21 disposed on the optical axis 15 between the pockel cell 19 and the end mirror 13. A linear polarizer 22 is disposed between the pockel cell 19 and the gain medium 16. The linear polarizer 22 is arranged such that vertically polarized light will pass therethrough but horizontally polarized light will be reflected from the face facing the pockel cell 19.

A master oscillator 23, such as a laser diode end-pumped Nd:YAG laser, produces a single axial mode output at a desired master oscillator wavelength, such as 1.06 microns with a power on the order of 200 microwatts. The output beam of the master oscillator is fed through a Faraday isolator 24 to a mirror 25 and thence onto the face of the vertical polarizer 22.

In operation, the polarization of the seed beam derived from the master oscillator 23 via the Faraday isolator 24 and mirror 25 is horizontally polarized so as to be reflected from the face of the vertical polarizer 22 along the optical axis 15 toward mirror 13. The voltage is OFF on the pockel cell 19 so that the horizontally polarized seed photons pass through the pockel cell 19, retaining their horizontal polarization, and thence through the quarterwave plate 21. In passing through the quarter wave plate 21, the polarization of the seed photon is changed to circular polarization and thence they are reflected from the mirror 13 back through the quarterwave plate 21 to produce vertical polarization of the seed photons.

Next, the seed photons pass through the vertical polarizer 22 and into and through the gain medium 16 and thence are reflected from mirror 14 back through the gain medium 16 retaining their vertical polarization. These seed photons then pass through the vertical polarizer 22, pockel cell 19 and through the quarterwave plate 21 at which point the polarization of the seed photons is changed to circular and, upon reflection from the mirror 13, are passed back through the quarterwave plate 21 to change the circular polarization of the seed photons to horizontal which is then reflected off of the vertical polarizer 22 and out of the optical resonator 20. The master oscillator 23 provides a cw source of seed radiation which continously flows into the slave laser 12 through the gain medium and then back out of the optical resonator 20.

Any vertically polarized radiation emanating from the gain medium 16 which passes through the vertical polarizer 22, pockel cell 19 and through the quarterwave plate 21, is converted to circular polarization. After being reflected from the mirror 13, the circular polarized radiation is converted to horizontal polarization and thence reflected from the vertical polarizer 22 out of the slave laser 12, such that the Q-switch 18 is operating in its lossy state preventing oscillation of the slave laser 12.

To turn ON the slave laser 12, a pulser 27 produces a negative going voltage waveform 29 which is passed through a pulse-shaper 28 to the pockel cell 19 for switching the pockel cell to a state wherein it appears as a quarterwave plate on the optical axis 15. With the pockel cell pulsed ON, the horizontally polarized seed photons reflecting off of the linear polarizer 22 are circularly polarized by the pockel cell 19 and thence converted to vertical polarized photons after passing through the quarterwave plate 21. Upon reflection from the mirror 13 and with the second passage through the quarterwave plate 21, the vertically polarized photons are converted to circular polarized photons which, upon passage back through the pockel cell 19, is converted to horizontal polarization which is thence reflected off of the vertical, linear polarizer 22 so that the flow of seed photons through the gain medium 16 is effectively shut-off.

Meanwhile, vertically polarized photons emanating from the gain medium 16 are passed through the vertical polarizer 22 into and through the pockel cell 19 which converts the vertical polarization to circular polarization which, upon passage through the quarterwave plate 21, is converted to horizontal polarization and upon reflection from mirror 13, back through the quarterwave plate, the slave laser photons are converted to circular polarization and then upon passage through the pockel cell 19 converted to vertical polarized photons which thence pass back through the vertical polarizer 22 and through the gain medium to stimulate further emission of radiation. Thus, a resonant mode of the slave laser builds up with a certain fraction of the power within the optical resonator 20 of the slave laser being extracted through mirror 14 as an output beam 30.

Thus, in operation, the slave laser 12 is continuously seeded with a continuous flow of seed photons of a single wavelength until such time as the slave laser 12 is pulsed ON by pulsing the Q-switch or pockel cell 19. When the pockel cell 19 is pulsed ON, there is a transition time during which the flow of seed photons is cut-off and the stimulated emission from the gain medium 16 of the slave laser 12 builds up to produce the output pulse extracted as output beam 30.

In the absence of the pulse shaper 28, the waveform for the pulse applied to the pockel cell 19 would be that as shown at 29 in FIG. 2. This waveform 29 is characterized by a very abrupt transition, i.e., transient condition during the application of the voltage across the pockel cell 19 which can occur in approximately 5 nanoseconds. Such an abrupt transition produces substantial Fourier sideband components of the seed photons wavelength, which Fourier components can stimulate undesired resonant modes of the optical resonator 20 of the slave laser 12. Accordingly, it is desired to transition the application of the turn-ON voltage to the pockel cell 19 in such a manner as to minimize the production of the unwanted Fourier transform components of the seed radiation.

Therefore, the pulse-shaper circuit 28 is employed which consists of a pair of series connected, saturable core inductors 31 and 32 and a length of coaxial cable 33 over which the energizing turn-ON voltage waveform is applied to the pockel cell 19 from the pulser 27. In a typical example, the saturable core inductors 31 and 32 comprise Stackpole Model 57-1393 inductors available from Electronics Components Division of Stackpole in St. Mary's Pa. Each of the saturable core inductors 31 and 32 comprises approximately 8 turns of conductor wound on a magnetic core.

The peak current supplied through the inductors 31 and 32 to the pockel cell 19 is approximately 2 amps. The resultant turn-ON voltage waveform applied to the pockel cell 19 through the pulse-shaper 28 is shown at 34 in FIG. 2. This waveform is characterized by a substantially reduced initial rate of change in the voltage applied to the pockel cell 19 during the initial 15 nanoseconds of turn-ON time. More particularly, the voltage applied across the pockel cell 19 in the first 15 nanoseconds is approximately −500 volts. Thereafter, the rate of change of the applied voltage 34 increases and remains substantially constant during the next 30 nanoseconds peaking out at −4.2 KV which provides approximately 1,000 volts of overshoot on the pockel cell 19. Thus, at the end of the 45 nanosecond transition period, the pockel cell 19 is turned completely ON, and the output pulse from the slave laser 12 is obtained as shown by waveform 35 of FIG. 2.

As an alternative to applying a turn-ON voltage, as of −3 KV to −4 KV, to the pockel cell 19 to initiate operation of the slave laser 12, the quarterwave plate 21 may be omitted and the pockel cell 19 operated with a quarterwave voltage thereon which is then pulsed to zero potential to initiate operation of the slave laser 12.

In a typical example, the master oscillator 23 comprises a diode laser end pumped Nd:YAG rod commercially available from Lightwave Electronics Co. of Mountain View, CA., as Model 1-105. The Faraday isolator 24 comprises an isolator Model 1-122 commercially available from Lightwave Electronics, Co. of Mountain View, CA. The pockel cell 19 comprises a Model 1059 pockel cell commercially available from Lasermetrics of Englewood, New Jersey. The pulser 27 and slave laser 12 comprise a Model DCR-2 laser commercially available from Spectra Physics of Mountain View, CA. The pockel cell 19 has a stray capacitance to-ground of approximately 10 pf and the coaxial cable 33 has a capacity-to-ground of approximately 20 to 40 pf.

The saturable core inductors 31 and 32 each have a Q less than 10 and preferably in the range of 2 to 3. The repetition rate for the slave laser 12 is in the range of 10 to 30 Hz.

The advantage of the present invention is that the shaping of the turn-ON Q-switch waveform to reduce the initial rate of change of the injected seed photons in the slave laser results in allowing improved mode control of the slave laser with substantially lower seed power. In this manner, better control over the single-mode operation of the slave laser is obtained with a less expensive seed laser.

What is claimed is:

1. In a seeded electro-optically Q-switched slave laser:

optical resonator means for resonating optical energy therein;

a laser gain medium disposed within said optical resonator means for imparting gain to a resonant mode of oscillation of said optical resonator means;

electro-optical Q-switch means disposed within said optical resonator means for switching-on the excited resonator mode of said optical resonator means;

seed means for injecting single-mode seed optical radiation of a wavelength of a resonant mode of said optical resonator means into said optical resonator means for causing said optical resonator means to resonate at the wavelength of said injected single-mode optical radiation;

pulser means for pulsing ON said Q-switch means with a pulsed flow of current to develop a pulse voltage waveform in the Q-switch means for injecting the single-mode seed optical radiation into said optical resonator for exciting a resonant mode thereof and for allowing build-up of a resonant mode of oscillation within said optical resonator means;

said pulser means including a saturable core inductor connected in series with the pulsed flow of current to said Q-switched means for causing the developed pulse voltage waveform to have an initially reduced rate of change to reduce unwanted Fourier frequency components of the seed optical radiation in said optical resonator, whereby enhanced single-mode operation of the slave laser is obtained.

2. The laser of claim 1 wherein said pulser means includes a plurality of said saturable core inductors connected in series with the pulsed flow of current to said Q-switched means for causing the developed pulsed voltage waveform to have the initially reduced rate of change.

3. The laser of claim 1 wherein said pulse means includes a length of coaxial cable connected to said Q-switch means and over which the pulsed flow of current flows to develop the pulse voltage waveform in said Q-switch;

said coaxial cable having its outer conductor grounded to an RF grounded terminal of said Q-switch, and wherein the distributed capacitance of said coaxial cable falls within the range of 10 to 40 pf as connected in parallel with the stray capacitance-to-ground of said Q-switch means.

4. The laser of claim 3 wherein said saturable core inductor has a Q less than 10.

5. The laser of claim 3 wherein the initial rate of change of the applied voltage waveform within the first 15 nanoseconds is less than 750 volts.

* * * * *